United States Patent [19]

Karady et al.

[11] 3,742,042
[45] June 26, 1973

[54] PROCESS OF PREPARING A STEREOISOMER OF α-HYDRAZINO-β-(PHENYL)ALKANOIC ACIDS

[75] Inventors: Sandor Karady, Elizabeth; Seemon H. Pines, Murray Hill; Manuel G. Ly, Edison; Meyer Sletzinger, North Plainfield, all of N.J.

[73] Assignee: Merck & Co. Inc., Rahway, N.J.

[22] Filed: June 24, 1970

[21] Appl. No.: 49,541

[30] Foreign Application Priority Data
Mar. 25, 1970 Canada .............................. 338,486

[52] U.S. Cl.......... 260/516, 260/518 A, 260/518 R, 260/519, 260/999

[51] Int. Cl.......................................... C07c 151/00

[58] Field of Search............ 260/519, 518 A, 518 R, 260/516

[56] References Cited
UNITED STATES PATENTS
3,506,714    4/1970    Hinkley et al. ..................... 260/519

Primary Examiner—Lorraine A. Weinberger
Assistant Examiner—L. Arnold Thaxton
Attorney—Francis H. Deef, I. Louis Wolk and Harry E. Westlake, Jr.

[57] ABSTRACT

A decarboxylase inhibiting stereoisomer of a α-hydrazino-β-(substituted or unsubstituted phenyl)alkanoic acid is prepared by reacting the stereoisomer of an intermediate with a halogenating agent in an inert solvent and an aqueous base.

12 Claims, No Drawings

PROCESS OF PREPARING A STEREOISOMER OF α-HYDRAZINO-β-(PHENYL)ALKANOIC ACIDS

The present invention relates to novel intermediates and to a novel and useful process for the preparation of chemical compounds. More particularly, it relates to a process which can be used to form one stereoisomer in the substantial absence of the other stereoisomer.

It is known in the art that various α-hydrazino-β-(substituted or unsubstituted phenyl)alkanoic acids are useful as decarboxylase inhibitors (see U.S. Pat. No. 3,462,536). In general, one stereoisomer of the racemate is more desirable than the other. This is due to the fact that even in such closely related compounds there are variations in activity, toxicity, side effects and the like due to the stereo configuration. In the past, it has been the accepted practice to separate stereoisomers by the formation of diastereomers with either optically active bases or acids, depending on the nature of the racemate. However, with the compounds of the present invention, separation is complicated by the fact that some diastereomers do not form crystalline materials with sufficiently different properties so that the diastereomers can be readily crystallized. In some instances, the diastereomers are oily or waxy materials which become difficult if not impossible to separate by conventional means. Quite obviously, if a relatively simple and inexpensive process could be found which would preferentially produce the desired stereoisomer, it would receive widespread acceptance in the art.

It is an object of the present invention to prepare such compounds wherein the final product is enriched with respect to one stereoisomer. Another object is to provide novel and useful intermediates. A further object is to prepare one stereoisomer in the substantial absence of the other. A still further object is to provide a process for preparing one stereoisomer by utilizing the corresponding intermediate stereoisomer under such conditions that racemization of the intermediate and final product does not take place during the reaction. Other objects will become apparent as the description of the invention proceeds.

These objects are accomplished by the present invention which provides a compound of the formula

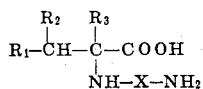

wherein $R_1$ is a substituted or unsubstituted phenyl radical containing less than about 25 carbon atoms; $R_2$ and $R_3$ are hydrogen or lower alkyl; and X is

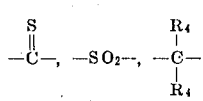

with each $R_4$ being hydrogen or polyhaloalkyl.

The present invention further provides a process for preparing a compound of the formula

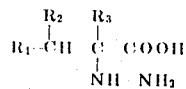

wherein $R_1$ is a substituted or unsubstituted phenyl radical containing less than about 25 carbon atoms and $R_2$ and $R_3$ are hydrogen or lower alkyl and said compound is enriched with respect to one stereoisomer which process comprises reacting a compound of the formula

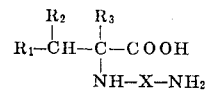

wherein $R_1$, $R_2$ and $R_3$ are as defined above, and X is

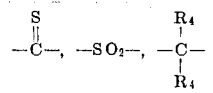

with each $R_4$ being hydrogen or polyhaloalkyl, and said compound is enriched with respect to one stereoisomer.

with a halogenating agent, in an inert solvent, and an aqueous base.

In a preferred embodiment of the present invention, the $R_1$ is a disubstituted phenyl radical, $R_2$ and $R_3$ are hydrogen or methyl and X is

In a particularly preferred embodiment of the present invention, $R_1$ is a 3,4-disubstituted phenyl radical and the halogenating agent is a positive halogen compound.

In another preferred embodiment of the present invention, the reaction is carried out at a temperature of −100°C to 200°C. and more preferable from a temperature of −15°C. to 150°C. In actual practice, a temperature of 0°C. to 125°C. is generally employed since it is easy to accomplish on both a laboratory scale and a commerical scale by the use of ice water or a simple heating system.

The expression "enriched with respect to one stereoisomer" merely signifies that the compound is predominantly present in the form of one stereoisomer and that it is not a racemate. In the preferred embodiment of the invention, the compound contains about 90 percent or more of one stereoisomer and it is generally the L-isomer. Since one object of the invention is to prepare a single stereoisomer in the substantial absence of the other, the starting material is generally as pure as can be readily obtained so that the final product does not have to be further purified. In this manner, one may start with a particular stereoisomer and end up with a final product in the same stereo configuration. The reaction is of particular significance because the L and D forms of the final product are identical in physical properties and their separation becomes extremely difficult.

The terminology "halogenating agent" is used in its broad sense to mean any chemical compound which will supply the halogen atom in the reaction. In a preferred embodiment of the present invention, the halogenating agent is a "positive halogen" compound or a positive halogen donor which supplies bromine, iodine or chlorine in a plus one valence state. The various materials which will supply positive halogen are well known in the art [see Fresenius "Angewandte Chemie" (1952) pages 470–478 and Arotsky et al. "Quarterly Reviews" Volume 16 (1962) pages 282–297] and include the hypohalous acids, the alkali and alkaline earth metal hypochlorites such as sodium hypochlorite, potassium hypochlorite, calcium hypochlorite and the like. Free halogens such as $Cl_2$, $Br_2$, and $I_2$ will also furnish positive halogen as does chloramine. Another source of positive halogen is the N-haloamides such as N,N'-dichlorohydantoin, N-chloroacetamide, N-chloro succinamide, N-chlorcaprolactam, N-chlorourea, N-chlorohydantoin as well as the N-bromo and N-iodo analogues of these compounds. All of these materials are well known and can be added simultaneously with the aqueous base. However, when using sources of positive halogen which are unstable in aqueous systems such as pyridinium perbromide and the alkyl hypochlorites such as t-butyl hypochlorite, an inert solvent such as dioxane, hexane, chloroform, carbon tetrachloride and alkanols are utilized in the first step and the aqueous base is then added sequentially. It is, of course, preferred to use the aqueous system so that the reaction proceeds in a single step.

The expression "inert solvent" merely signifies a liquid in which the reaction can be carried out without the liquid interfering with the reaction. The term "aqueous" means that water is present in the system. While any amount of water can be added, it is generally preferred that the reaction be carried out with water as the solvent so an aqueous source of positive halogen is generally utilized in the system. The term "base" is used in the broader sense to encompass the inorganic bases and tertiary organic amines. Among inorganic bases which are suitable are the alkali and alkaline earth metal hydroxides such as sodium hydroxide, potassium hydroxide, calcium hydroxide, lithium hydroxide, rubidium hydroxide, cesium hydroxide, barium hydroxide as well as the carbonates and other basic salts of such elements. Also included are ammonium hydroxide as well as aliphatic amines, aromatic amines and heterocyclic amines. Such amines include triethylamine, N,N-diethyl aniline, N,N,N',N'-tetraethylethylenediamine and pyridine as well as the picolines, lutidines and other tertiary organic amines.

While the exact reaction sequence is not known and the inventors do not wish to be bound by any theory as to the mechanism of reaction, it seems likely that the reaction scheme is as follows:

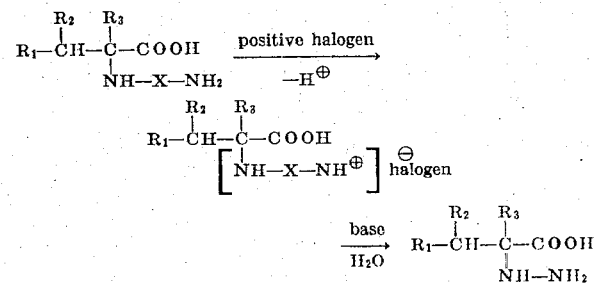

wherein
$R_1$, $R_2$, $R_3$ and X are as defined above.

In the reaction, it appears likely that the positive halogen displaces a proton from one of the nitrogen atoms as shown. The addition of the base and water then removes both the halogen and the carbonyl group from the compound. The reaction mechanism is such that it does not interfere with the stereo configuration of the molecule so that if the stereo configuration of the starting material is L the final product will also have the L configuration.

As previously pointed out, when the source of positive halogen is in an aqueous system, the addition of the reactants can be simultaneous and the reaction will proceed smoothly to the final product. The sources of positive halogen used in aqueous systems include the alkali and alkaline earth metal hypohalites, the free halogen and the N-haloamides as well as others. When using such materials as pyridinium perbromide and alkyl hypohalites, the reaction is first carried out in a non-aqueous system to form the intermediate product which is then reacted with the aqueous base to form the final product. Thus, the reaction can be carried out either simultaneously or sequentially, depending upon the source of positive halogen.

The process of the present invention can be utilized to form the stereoisomers of the various compounds of U.S. Pat. No. 3,462,536 as well as others. A comprehensive list of such final products appears in the patent.

The following examples are given to illustrate the invention and are not intended to limit it in any manner. All parts are given in parts by weight unless otherwise expressed. In the examples, the indicated L-isomer is present in the substantial absence of the other isomer, i.e. the examples employ 100 percent L.

EXAMPLE 1

Preparation of L-α-(3,4-dimethoxybenzyl)-α-N-sulfamylalanine methyl ester

To a solution of L-α-(3,4-dimethoxybenzylalanine) (239 g., 1.0 mole) in methanol (500 ml.) is added gaseous hydrogen chloride until the saturation point is reached at 20°. The mixture is stirred at room temperature for 42 hours and then concentrated to dryness in vacuo. To the residue dissolved in methanol is added with cooling triethylamine (101 g., 1.0 mole) and sulfamide (96.1 g., 1.0 mole). The mixture, with stirring, is slowly heated to reflux, maintained for 18 hours and concentrated to dryness in vacuo. The residue is recrystallized from methanol-water to yield L-α-(3,4-dimethoxybenzyl)-α-N-sulfamylalanine methyl ester.

Preparation of L-α-(3,4-dimethoxybenzyl)-α-hydrazinopropionic acid

To an ice-cold mixture of the ester (160.2 g., 0.5 mole) in 2.5 N potassium hydroxide (600 ml.) is added 0.71 N sodium hypochlorite (892 ml., 0.625 moles). After 5 minutes at 0°–5°, the mixture is heated with stirring to 80° and maintained for 1.5 hours. After this period, the mixture is cooled to 35°, 2.0 liter of toluene is added and the mixture is acidified with concentrated hydrochloric acid to pH 2. The mixture is stirred for 0.5 hour, the phases are separated and the aqueous phase is washed with 0.5 liter of toluene. The aqueous phase is concentrated to dryness in vacuo and the residue digested with ethanol at reflux. The ethanolic extract is brought to pH 6.4 with diethylamine and the precipitate removed by filtration is washed with ethanol and dried to yield L-α-(3,4-dimethoxybenzyl)-α-hydrazinopropionic acid.

Preparation of L-α-(3,4-dihydroxybenzyl)-α-hydrazinopropionic acid

The L-α-(3,4-dimethoxybenzyl)-α-hydrazinopropionic acid is dissolved in 150 ml. of concentrated hydrochloric acid and heated in a sealed tube at 120° for 2 hours. The resulting mixture is evaporated to dryness in vacuo and the product leached out with ethanol. The hydrazino acid is precipitated by the addition of diethylamine to pH 6.4, the mixture is filtered and the precipitate washed with ethanol and dried. Recrystallization from water containing a small amount of sodium bisulfite yields the final product.

EXAMPLE 2

Preparation of L-α-(3,4-dimethoxybenzyl)-α-N-aminomethylalanine hydrosulfate

L-α-(3,4-dimethoxybenzyl)-α-alanine methyl ester from Example 1 (116.65 g., 0.5 mole) and methylenediamine sulfate (116.65 g., 0.805 mole) in dimethylsulfoxide (1 liter) are warmed at 90°-95° with stirring for 6 hours. The mixture is cooled to room temperature, diluted with an equal volume of dioxane and filtered. The precipitate is washed with dioxane and dried to yield L-α-(3,4-dimethoxybenzyl)-α-N-aminomethylalanine methyl ester hydrosulfate.

Preparation of L-α-(3,4-dimethoxybenzyl)-α-hydrazinopropionic acid

The ester salt of the previous step (70.1 g., 0.2 mole) is slurried with benzene (0.5 liter) and with cooling (0°-5°) and stirring sodium methoxide (21.2 g., 0.4 mole) is added gradually. After stirring for 0.5 hour at 0°-5°, t-butyl-hypochlorite (22.8 g., 0.21 mole) is added with cooling (0°-5°) and stirring is continued. The mixture is poured with stirring into 10% sodium hydroxide (300 ml.) at 0°. With stirring continued, the mixture is allowed to warm to room temperature. Stirring is continued until the two liquid layers are solutions. The layers are separated, the aqueous washed with benzene and then acidified with cooling by addition of 6 N hydrochloric acid. The product is separated by filtration, washed and dried and recrystallized from methanol-water to yield L-α-(3,4-dimethoxybenzyl)-α-hydrazinopropionic acid.

Preparation of L-α-(3,4-dihydroxybenzyl)-α-hydrazinopropionic acid

The acid from the previous step is demethylated as described in Example 1.

EXAMPLE 3

Preparation of L-4-(3',4'-dimethoxybenzyl)-4-methylthiohydantoic acid

To a solution of L-α-methyl-(3,4-dihydroxyphenyl)-alanine (100 g., 0.47 mole) and sodium bisulfite (0.6 g.) in water (500 ml.) is added potassium thiocyanate (69.0 g., 0.71 mole) and the solution is heated at 60° in a nitrogen atmosphere for 1 hour. Another 69.0 g. portion of potassium thiocyanate is added and the heating continued for 2 hours. The mixture is distilled until the odor of ammonia is no longer detectable. The residue is diluted to the original volume with water, 20 ml. of 8 N potassium hydroxide is added and the mixture cooled to 15°C. The mixture is well agitated while 8 N potassium hydroxide (566 ml.) and dimethyl sulfate (376 ml., 3.6 moles) are added simultaneously at such a rate that the temperature is maintained below 20°C. The addition takes about 1 hour. After 0.5 hour additional of agitation, the mixture is extracted with ether to remove a small amount of hydantoin.

The aqueous layer is acidified to pH 2 with concentrated hydrochloric acid and the mixture is filtered. The precipitate is washed, dried in air and recrystallized to yield L-4-(3',4'-dimethoxybenzyl)-4-methylthiohydantoic acid.

Preparation of L-α-(3,4-dimethoxybenzyl)-α-hydrazinopropionic acid

To an ice-cold mixture of hydantoic acid (74.6 g., 0.25 mole) in 2.5 N potassium hydroxide (500 ml.) is added a solution of sodium hypochlorite (440 ml., 0.71 N, 0.312 mole). Five minutes after the addition is completed, the solution is heated to 80° for 1.5 hours. After this period, an equal volume of toluene and 85 percent hydrazine hydrate (24 ml.) is added and the mixture vigorously agitated while adding concentrated hydrochloric acid (257 ml.). The mixture is stirred at 80° for 0.5 hour, the phases are separated and the aqueous washed with 500 ml. of toluene. The toluene layer contains 3,4-dimethoxyphenylacetone and its condensation products. The aqueous layer is taken to dryness in vacuo and the residue digested with hot ethanol. The alcoholic solution is neutralized to pH 6.4 with diethylamine and the precipitated product separated by filtration washed and dried in air. The crude material is recrystallized from methanol-water to yield L-α-(3,4-dimethoxybenzyl)-α-hydrazinopropionic acid.

Preparation of L-α-(3,4-dihydroxybenzyl)-α-hydrazinopropionic acid

The acid from the previous step is demethylated as previously described to yield the subject compound.

EXAMPLE 4

Preparation of L-α-(3,4-dimethoxybenzyl)-α-N-(aminohexafluoroisopropyl)alanine methyl ester L-α-(3,4-dimethoxybenzyl)-α-alanine methyl ester from Example 1 (126.65 g., 0.5 mole) and hexafluoroisopropylideneimine (82.5 g., 0.5 mole) in dimethoxyethane are warmed at 60°-65° for 0.5 hour. The mixture is concentrated to dryness in vacuo and the residue crystallized from methanol-water to yield L-α-(3,4-dimethoxybenzyl)-α-N-(aminohexafluoroisopropyl)alanine methyl ester.

Preparation of L-α-(3,4-dimethoxybenzyl)-α-hydrazinopropionic acid

To an ice-cold mixture of substituted alanine (83.67 g., 0.4 mole) from the previous step in 2.5 N potassium hydroxide (480 ml.) is added 0.71 N sodium hypochlorite (705 ml., 0.50 mole). After 5 minutes at 0°-5°, the mixture is heated with stirring to 80° and maintained for 1.5 hours. After this period, the mixture is cooled to about 35°, acidified to pH 2 and again heated at 80° with stirring for 1.5 hours. The mixture is cooled to room temperature, extracted successively with two equal volumes of toluene. The aqueous phase is concentrated to dryness in vacuo and the residue leached with ethanol at reflux. The ethanolic extract is brought to pH 6.4 with diethylamine and the precipitate removed by filtration, washed with ethanol and dried to yield crude L-α-(3,4-dimethoxybenzyl)-α-hydrazinopropionic acid. The crude material is recrystallized from methanol-water.

Preparation of L-α-(3,4-dihydroxybenzyl)-α-hydrazinopropionic acid

The acid from the previous step is demethylated as previously described to yield the subject compound.

EXAMPLE 5

Preparation of L-α-(3,4-dibenzyloxy)-α-methylphenylalanine

L-α-methyldopa sesquihydrate (238.24 g., 1.0 mole) is heated with 2.5 liter of toluene and the mixture azeotropically distilled. Water is separated and toluene returned to the distillation vessel by means of a Dean-Stark separator. When no more water collects, the mixture is concentrated to dryness in vacuo. The residue is taken up in 2 liters of methanol and with cooling to 5°–10°, dry hydrogen cloride is passed in to saturate the solution. The mixture is allowed to stand 42 hours at room temperature and then concentrated to dryness in vacuo. The residue is taken up in 2 liters of methanol and with stirring and cooling, sodium methylate (167.4 g., 3.1 moles) is added. With stirring, benzyl chloride (233.2 g., 2.0 moles) is added and the mixture refluxed for 4 hours.

Water is added, the mixture is made strongly alkaline (pH 12) with sodium hydroxide and the whole refluxed for 2 hours. The mixture is distilled until the methanol is totally removed. The residue is cooled to 35°, acidified with concentrated hydrochloric acid to pH 2.5 and filtered. The crude product is washed with water, dried and recrystallized from methanol-water to yield L-α-(3,4-dibenzyloxy)-α-methylphenylalanine.

The amino acid (205.7 g., 0.5 mole) from the previous step is dissolved in methanol (2 liters) and with cooling to 5°–10°, dry hydrogen chloride is passed in to saturate the solution. The mixture is allowed to stand 42 hours at room temperature and then concentrated to dryness in vacuo. The residue is slurried with ether (5 liters) and triethylamine (32.6 g., 0.5 mole) is added with stirring to liberate the amino acid from its hydrochloride salt. The mixture, filtered, washed with ether and diluted with ether to 10 liters for the next step, contains L-α-(3,4-dibenzyloxy)-α-methylphenylalanine methyl ester.

To well-cooled (−25°) pyridine (500 ml.) is added with stirring chloral (131.4 g., 1.0 mole). Ammonia (20.8 ml.) at −78° (17.0 g., 1.0 mole) is distilled into the mixture while maintaining the temperature −25° to −30°. The reaction mixture is warmed to room temperature, a condenser is attached (water cooled), the mixture heated gently at reflux and the distillate which escapes the condenser is distilled into the stirred ethereal solution of L-α-(3,4-dibenzyloxy)-α-methylphenylalanine methyl ester cooled in a Dry Ice-acetone bath.

The ethereal mixture is allowed to warm to room temperature with stirring and then concentrated to dryness by distillation. The residue is crystallized from methanol to yield L-α-(3,4-dibenzyloxybenzyl)-α-N-(aminotrichloroethyl)alanine methyl ester.

Preparation of L-α-(3,4-dibenzyloxybenzyl)-α-hydrazinopropionic acid

To the ester from the previous step (55.19 g., 0.1 mole) in benzene (0.5 liter) is added gradually at 0°–5° t-butylhypochlorite (11.4 g., 0.105 mole). With stirring, the mixture is warmed to 25° and maintained with stirring for 2 hours. The mixture is poured with stirring into 10 percent sodium hydroxide (150 ml.) at 0°. The mixture is allowed to warm to room temperature and stirring continued until the two liquid layers are solutions. The layers are separated, the aqueous washed with benzene and then acidified by addition of 6 N hydrochloric acid. The product is separated by filtration, washed, dried and recrystallized from water to yield L-α-(3,4-dibenzyloxybenzyl)-α-hydrazinopropionic acid.

Preparation of L-α-(3,4-dihydroxybenzyl)-α-hydrazinopropionic acid

The acid from the previous step is debenzylated as previous described for demethylation to yield the subject compound. Alternatively, the acid is obtained by hydrogenation in acetic acid solution (200 ml.) over 5 percent palladium-on-charcoal (1.0 g.) at room temperature and 1 to 3 atmospheres pressure.

Many other equivalent modifications would be apparent to those skilled in the art from a reading of the foregoing without a departure from the inventive concept.

What is claimed is:

1. A compound of the formula

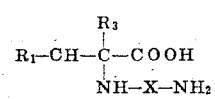

wherein $R_1$ is an unsubstituted phenyl radical or a 3,4-disubstituted phenyl radical wherein the substituents are hydroxy or hydrocarbyloxy groups containing from one to seven carbon atoms; $R_3$ is hydrogen or lower alkyl; and X is

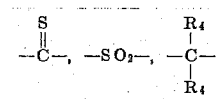

with each $R_4$ being hydrogen or polyfluoroloweralkyl.

2. The compound of claim 1 wherein X is

3. The compound of claim 1 wherein X is $-CH_2-$.
4. The compound of claim 1 wherein X is $-SO_2-$.
5. The compound of claim 1 wherein X is

6. A process for preparing a compound of the formula

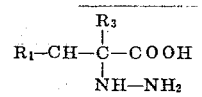

wherein $R_1$ is an unsubstituted phenyl radical or a 3,4phenyl pheny radical wherein the substituents are hydroxy or hydrocarbyloxy groups containing from one to seven carbon atoms and $R_3$ is hydrogen or lower alkyl and said compound is enriched with respect to one stereoisomer, which comprises reacting, at a temperature of −100°C. to 200°C., a compound of the formula

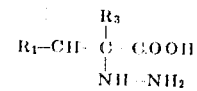

wherein $R_1$ and $R_3$ are as defined above, and X is $$-\overset{S}{\underset{\parallel}{C}}-,\ -SO_2-,\ -\underset{\underset{R_4}{|}}{\overset{\overset{R_4}{|}}{C}}-$$

with each $R_4$ being hydrogen or polyhaloloweralkyl, and said compound is enriched with respect to one stereoisomer, with a halogenating agent, in an inert solvent, and an aqueous base.

7. The process of claim 6 wherein the reaction is carried out at a temperature of −15°C. to 150°C.

8. The process of claim 6 wherein the reaction is carried out at a temperature of 0°C. to 125°C.

9. The process of claim 6 wherein the halogenating agent is free halogen.

10. The process of claim 6 wherein the halogenating agent is an inorganic hypohalite.

11. The process of claim 6 wherein the halogenating agent is an N-haloamide.

12. The process of claim 6 wherein the halogenating agent is an N-haloimide.

* * * * *

UNITED STATES PATENT OFFICE
CERTIFICATE OF CORRECTION

PATENT NO. : 3,742,042
DATED : June 26, 1973
INVENTOR(S) : Sandor Karady et al

It is certified that error appears in the above-identified patent and that said Letters Patent are hereby corrected as shown below:

Column 8, Claim 1, First structural formula should be

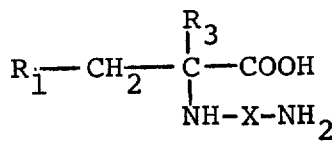

Column 8, Claim 6, First structural formula should be

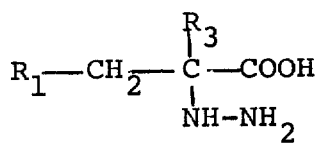

Column 8, line 56 - Delete the first "phenyl and insert in its place -disubstituted.

Column 8, Claim 6, Second structural formula should be

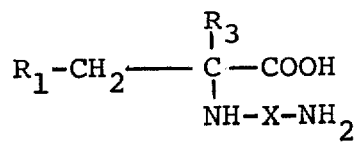

Signed and Sealed this twenty-seventh Day of January 1976

[SEAL]

Attest:

RUTH C. MASON
*Attesting Officer*

C. MARSHALL DANN
*Commissioner of Patents and Trademarks*